(12) United States Patent
Wiltz

(10) Patent No.: US 8,104,746 B2
(45) Date of Patent: Jan. 31, 2012

(54) ENERGY EFFICIENT COOLING TOWER SYSTEM UTILIZING AUXILIARY COOLING TOWER

(76) Inventor: Vincent Wiltz, Krotz Springs, LA (US)

( * ) Notice: Subject to any disclaimer, the term of this patent is extended or adjusted under 35 U.S.C. 154(b) by 457 days.

(21) Appl. No.: 12/490,094

(22) Filed: Jun. 23, 2009

(65) Prior Publication Data

US 2010/0263826 A1    Oct. 21, 2010

Related U.S. Application Data

(60) Provisional application No. 61/169,970, filed on Apr. 16, 2009.

(51) Int. Cl.
*B01F 3/04* (2006.01)

(52) U.S. Cl. ............. 261/23.1; 261/25; 261/29; 261/89; 261/DIG. 11

(58) Field of Classification Search .................. 261/23.1, 261/25, 29, 36.1, 84, 89, DIG. 11; 165/47, 165/108, 122; 417/334
See application file for complete search history.

(56) References Cited

U.S. PATENT DOCUMENTS

| | | | |
|---|---|---|---|
| 621,718 A * | 3/1899 | Seymour, Jr. | 261/8 |
| 2,672,328 A * | 3/1954 | Mart et al. | 261/25 |
| 3,195,870 A | 7/1965 | Gruber et al. | |
| 3,253,819 A | 5/1966 | Talbot | |
| 3,589,840 A | 6/1971 | Murphy | |
| 3,667,864 A | 6/1972 | Murphy | |
| 3,669,421 A * | 6/1972 | Murphy | 261/25 |
| 4,149,588 A | 4/1979 | Waters | |
| 4,386,946 A | 6/1983 | Wurz | |
| 4,443,389 A * | 4/1984 | Dodds | 261/153 |
| 5,437,157 A | 8/1995 | Bronicki | |
| 5,860,279 A | 1/1999 | Bronicki et al. | |
| 7,019,411 B2 | 3/2006 | Satou et al. | |

* cited by examiner

*Primary Examiner* — Charles Bushey
(74) *Attorney, Agent, or Firm* — Garvey, Smith, Nehrbass & North, L.L.C.; Gregory C. Smith; Julia M. FitzPatrick

(57) ABSTRACT

A cooling tower system, including a principal cooling tower; an auxiliary cooling tower for receiving a portion of the warm water flow into the main tower; a central shaft mounted vertically in the auxiliary tower; a turbine mounted on a portion of the shaft; a cooling blade mounted on the upper end of the shaft; a water jetting system delivering warm water under pressure from the main cooling tower into the auxiliary cooling tower to impart rotation to the turbine blades for imparting rotation to the cooling blade; a quantity of high efficiency film fill in that portion of the tower below the turbine for receiving the water coming off of the turbine blades; air flow produced by rotation of the cooling blade upward through the fill in order to cool the water before it is returned to the main cooling tower.

11 Claims, 7 Drawing Sheets

ENERGY EFFICIENT COOLING TOWER SYSTEM UTILIZING AUXILIARY COOLING TOWER

CROSS-REFERENCE TO RELATED APPLICATIONS

Priority of U.S. Provisional Patent Application Ser. No. 61/169,970, filed Apr. 16, 2009, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to cooling towers. More particularly, the present invention relates to an auxiliary air-conditioning cooling tower in which the cooling fan is mounted on the same shaft as the turbine, so that less energy is expended, and warm water from the main cooling tower is cooled more efficiently through high efficiency film fill before being returned to the main tower, in a great savings of energy.

2. General Background

It is well known in the art that a conventional cooling tower comprises a counter flow type horizontal layer of fill wherein a quantity of the water to be cooled is pumped in to be distributed over the fill so that air which is drawn from below and through the fill and is drawn out of the top of the tower serves to cool the water film being distributed through the fill in order to cool the water to a reasonable temperature to be re-utilized. That being the case, the amount of water being cooled through such a conventional tower from air being drawn through the fill from the top situated fan is very limited and serves as a disadvantage in attempting to cool large quantities of water, and at the same time utilizes a great deal of energy in order to operate the system.

In the current state of air-conditioning cooling towers, the cooling tower is designed to cool the water flowing into the tower, and the cooling fan at the upper end of the tower is usually driven by an electric motor or the like. Therefore, there is a greater amount of energy used to operate the system. Additionally, the cooling towers in the current state of the art utilize a low efficiency cross flow fill which does not allow the water to be cooled efficiently and does not capture the energy in the water being cooled.

The following U.S. Patents are incorporated herein by reference:

TABLE

| U.S. PAT. NO. | TITLE | ISSUE DATE |
|---|---|---|
| 3,195,870 | Helicopter Type Fans For Cooling Towers | Jul. 20, 1965 |
| 3,253,819 | Cooling Towers | May 31, 1966 |
| 3,589,840 | Turbines | Jun. 29, 1971 |

TABLE-continued

| U.S. PAT. NO. | TITLE | ISSUE DATE |
|---|---|---|
| 3,667,864 | Air—or Gas—Moving Equipment For Use With Heat Exchange and/or Gas-Scrubbing Apparatus | Jun. 6, 1972 |
| 4,149,588 | Dry Cooling System | Apr. 17, 1979 |
| 4,386,946 | Water Cooling Tower Including A Suction Fan | Jun. 7, 1983 |
| 5,437,157 | Method of and Apparatus For Cooling Hot Fluids | Aug. 1, 1995 |
| 5,860,279 | Method and Apparatus For Cooling Hot Fluids | Jan. 19, 1999 |
| 7,019,411 | Energy Recovery Apparatus and Method of Operating Energy Recovering Apparatus | Mar. 28, 2006 |

SUMMARY OF THE PRESENT INVENTION

The present invention solves the problems in the art in a simple and straightforward manner. What is provided is A cooling tower system, including a principal cooling tower; an auxiliary cooling tower for receiving a portion of the warm water flow into the main tower; a central shaft mounted vertically in the auxiliary tower; a turbine mounted on a portion of the shaft; a cooling blade mounted on the upper end of the shaft; a water jetting system delivering warm water under pressure from the main cooling tower into the auxiliary cooling tower to impart rotation to the turbine blades for imparting rotation to the cooling blade; a quantity of high efficiency film fill in that portion of the tower below the turbine for receiving the water coming off of the turbine blades; air flow produced by rotation of the cooling blade upward through the fill in order to cool the water before it is returned to the main cooling tower.

Therefore, it is a principal object of the present invention to provide a system which unloads an existing cooling tower, resulting in colder water being obtained in the main cooling tower, while cooling a significant water loading to optimal cold water temperature without requiring the use of an electric motor to drive the fan.

It is a further object of the present invention to provide a system wherein less energy is used, and the water driving the turbine then is passed through a film fill below the turbine and cooled from the air drawn through the fill by the fan above the turbine. After being cooled, the water is then recycled into the system to repeat the cycle.

It is a further object of the present invention to provide a system which is able to capture the extra energy in the water which is available because of the relatively inefficient cross flow fill compared with the high efficiency film fill in the present invention of 48' of cross flow equals 4' of film fill in most cases. In the present state of the art, the turbine is usually driven by a separate motor.

Therefore, it is a principal object of the present invention to provide a cooling tower system which can be adapted to any size of cooling towers, including large industrial cooling tower systems.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 10 illustrates a partial view of the powering of the turbine blades in the system of the present invention.

DETAILED DESCRIPTION OF THE PREFERRED EMBODIMENT

Figure 1:
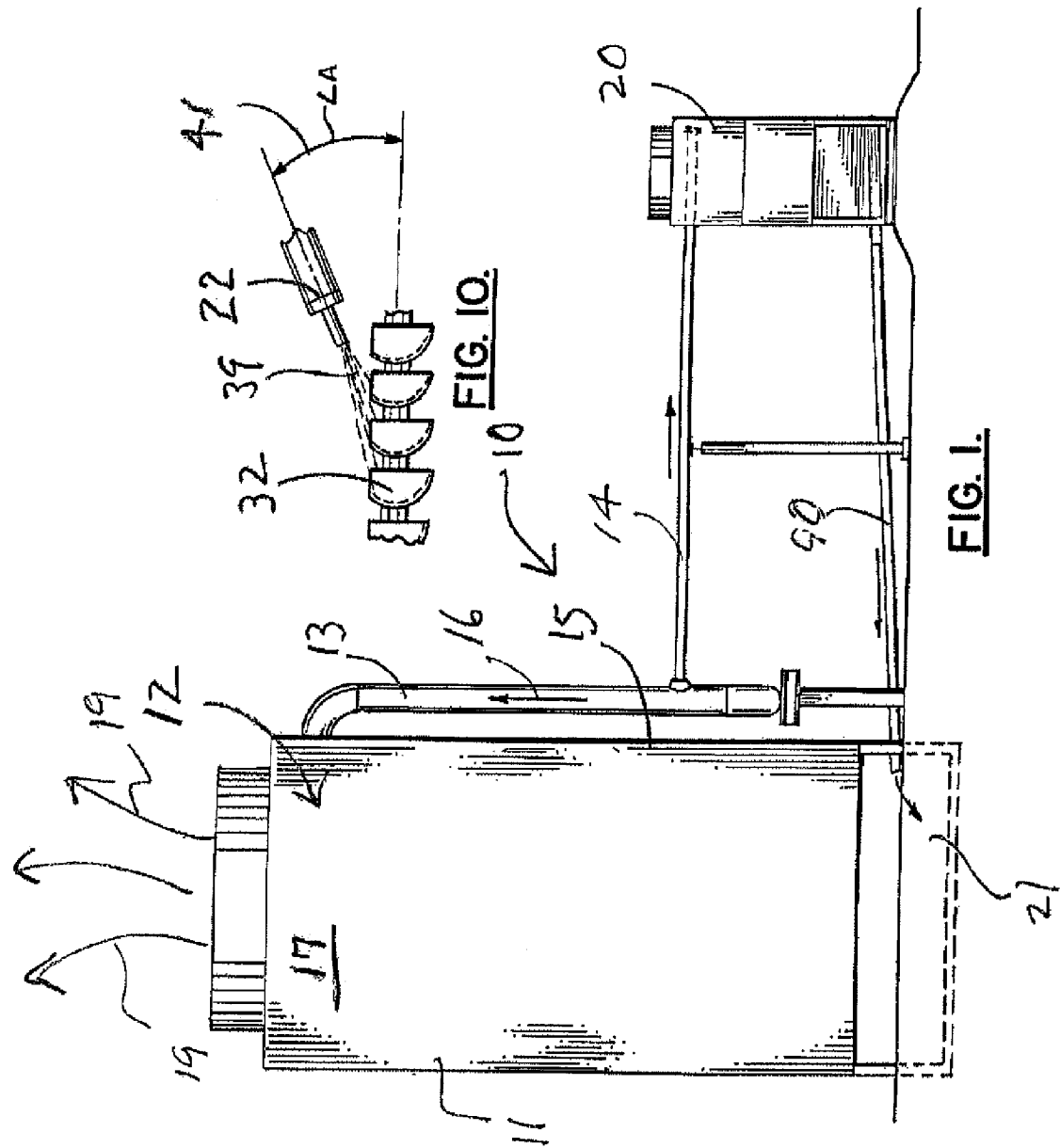
FIG. 1 illustrates a site view of the main cooling tower and auxiliary cooling tower of the system of the present invention.

The system of the present invention is illustrated in FIGS. 1 through 10 by the numeral 10. As seen in FIG. 1, there is illustrated system 10, comprising a principal cooling tower 12 of the type currently known in the art. Such a tower comprises a closed tower power 11, having an upper cooling blade, which is driven by electrical power. Warm water flows into the tower 12 and is cooled by an upflow of air drawn by the cooling blade, so that the water is returned to the cooling system with the heat removed. The warm water is re-circulated to the tower and the process continues. As stated earlier, the components and operation of cooling tower 12 are well known in the art and do not need to be more fully discussed herein. As an example of the prior art listed in the IDS filed herewith, see U.S. Pat. No. 4,386,946 issued to Wurz, entitled "Water Cooling Tower Including A Suction Fan", where the water cooling tower includes a cooling means and a suction fan further including a water catching channel around the wall of the air outlet passage at the bottom of the channel to collect water separated at and flowing along the air outlet passage channel.

The cooling tower system of the present invention offers an improvement in the conventional cooling tower systems, such as large industrial systems, which is a very efficient and results in a savings of energy. In the system of the present invention, there is illustrated in FIG. 1 a water return line 13, running along the outer wall 15 of principal tower 12, which is directed into the upper portion 17 of the main tower 12, wherein warm water flowing in the direction of arrow 16 flows into the upper portion 17 of principal tower 12 and is allowed to flow downward through gravity, where it is then cooled by the flow of air upward (Arrows 19) through the tower 12, drawn by the cooling blade at the upper end of the main tower, again as is done in these conventional type of cooling towers.

As a further in FIG. 1, there a line 14 which would tap into principal return line 13 which directs some of the warm water flow into the main tower 12 into line 14 into the auxiliary tower 20. At this point in the system, reference is now made to FIG. 2, which is a cross-section view of auxiliary power 20. As a discussion of auxiliary tower 20 goes forward, reference should be made to FIGS. 3 through 7, which are various views of the components in auxiliary tower 20, so that when a discussion of these components are referenced in FIG. 2, reference is also being made in these other partial views of the entire auxiliary tower 20 shown in FIG. 2.

Figure 4:
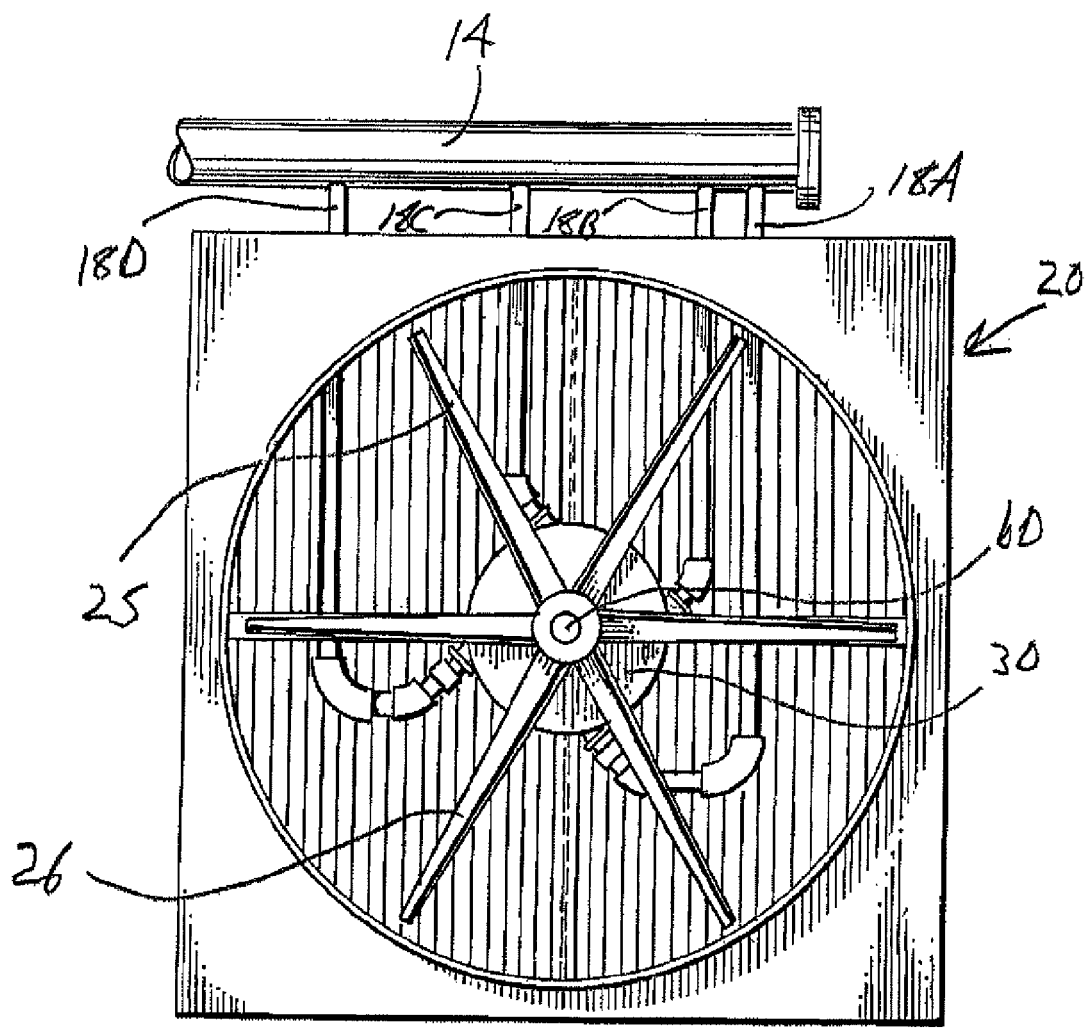
FIG. 4 illustrates a cross-section view of the system of the present invention along lines 4-4 in FIG. 2.

Starting first with FIG. 4, this figure illustrates in top view, a conventional rotary cooling fan 25, which comprises a plurality of blades 26, which would be utilized in drawing air upward through the cooling tower 20 as will be the discussed further.

Figure 3:
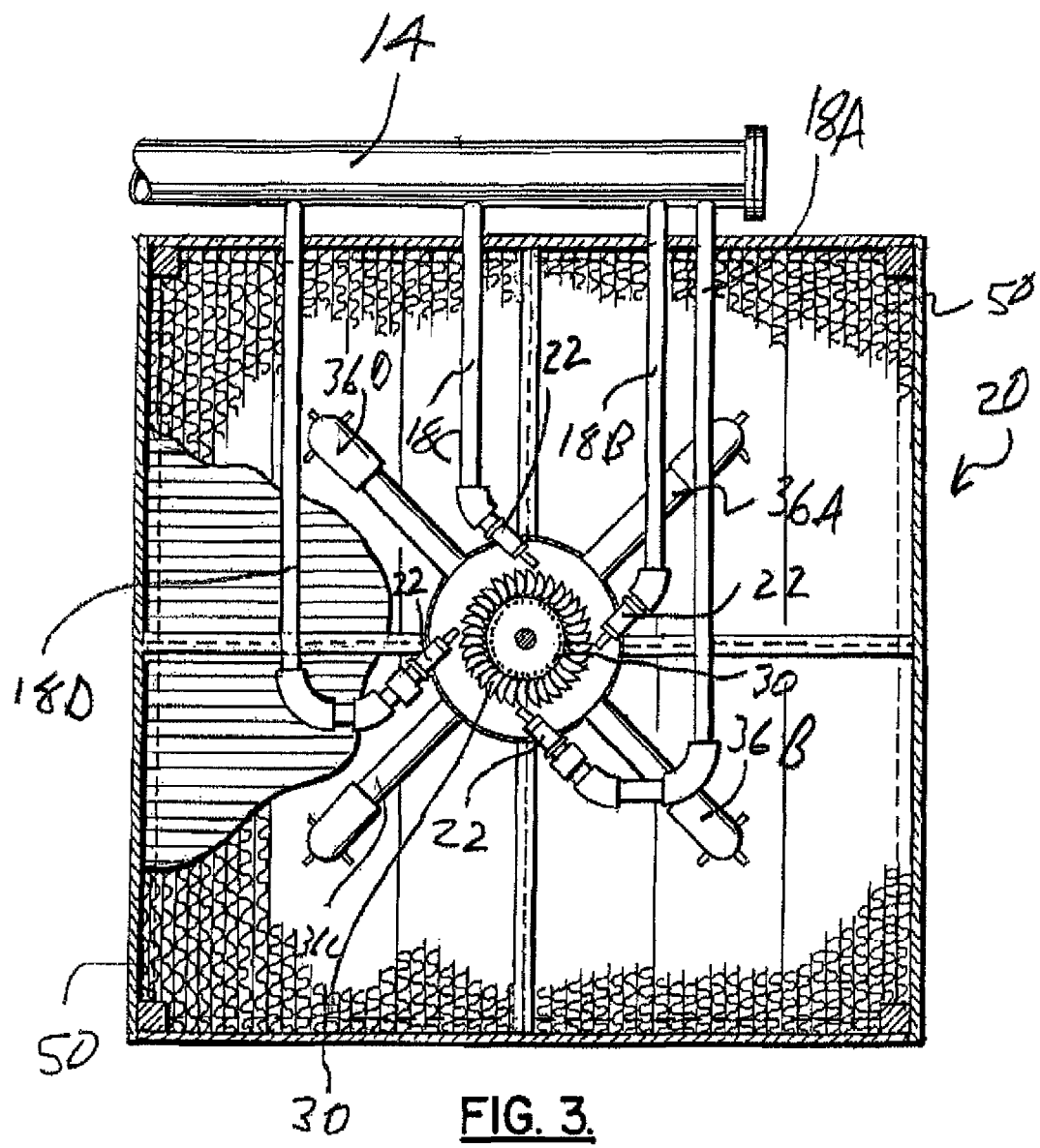
FIG. 3 illustrates a cross-section view of the system of the present invention along lines 3-3 in FIG. 2.
Figure 5:
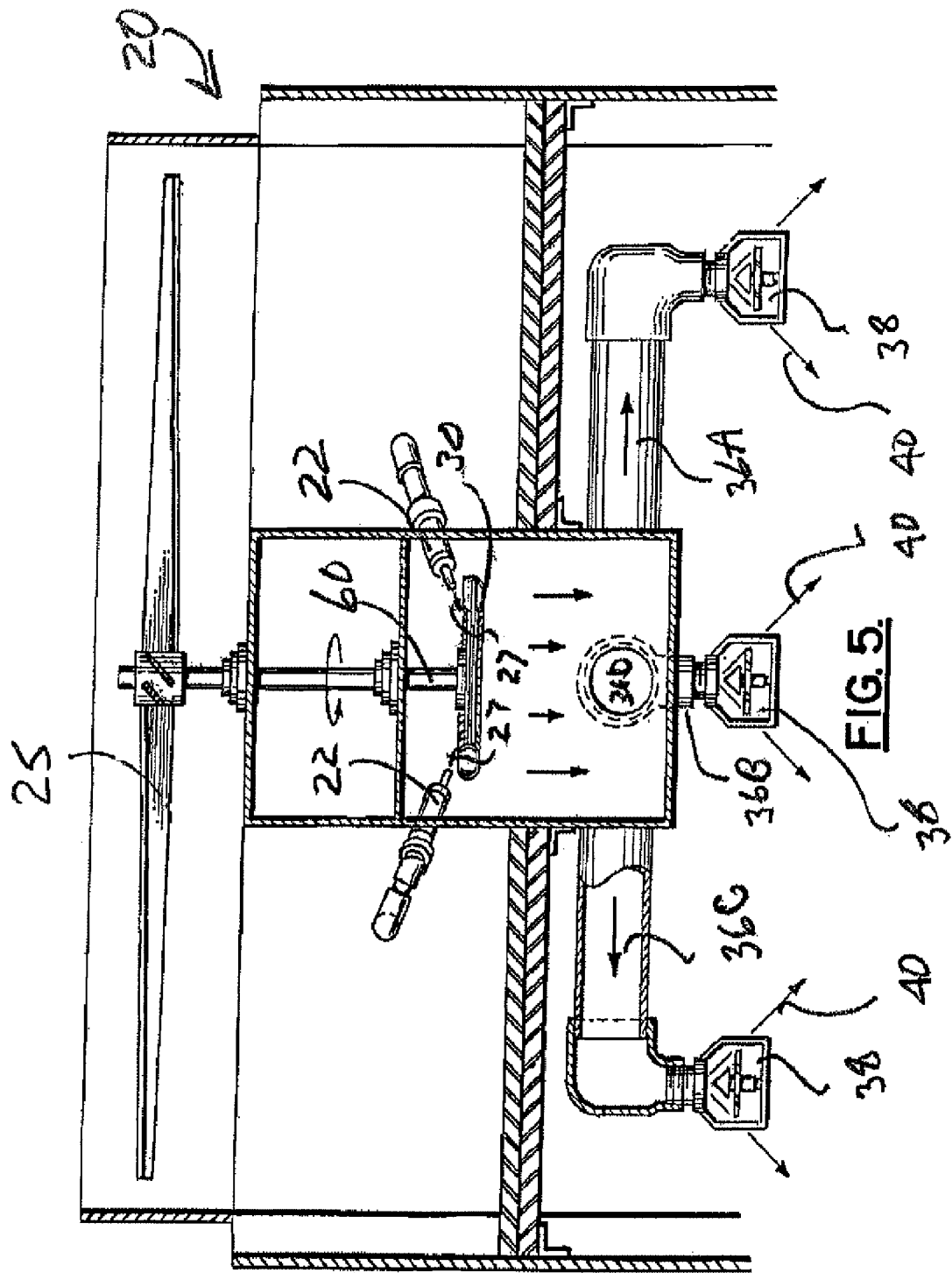
FIG. 5 illustrates a cross-section view of the upper portion of the auxiliary power of the present invention.

The critical point in this discussion will refer to FIGS. 3 and 5, where there is illustrated in FIG. 3 in top view, pipe 14 carrying the water from line 13 of the main tower 12, under pressure, into the auxiliary tower 20. The water in line 14 is diverted into four individual flow pipes 18A through 18D, each of which terminate in a series of nozzles 22 and eject water under pressure (lines 27, in FIG. 5). The water contacts a turbine 30, which as seen in FIG. 5, is mounted on a shaft 60, upon which the cooling fan 25 is also mounted. As seen in detail view in FIGS. 8 and 9, turbine 30 comprises a plurality of individual blades 32 configured into a cup shape defining a cup 33, each cup 33 having a concave opening 34, with the top of each cup 33 removed, which would facilitate the flow of water under pressure from the four pipes 18A through 18D. The flow of water under pressure into the cups 33 of turbine 30 would impart rotation to turbine 30 which would also impart rotation to the rotary blade 25. Therefore, the flow of water under pressure would be the source of power to the turbine 30 and the rotary fan 25 for the auxiliary tower 20 to function in an auxiliary manner in cooling water together with the water being cooled by the principal tower 12.

Figure 2:
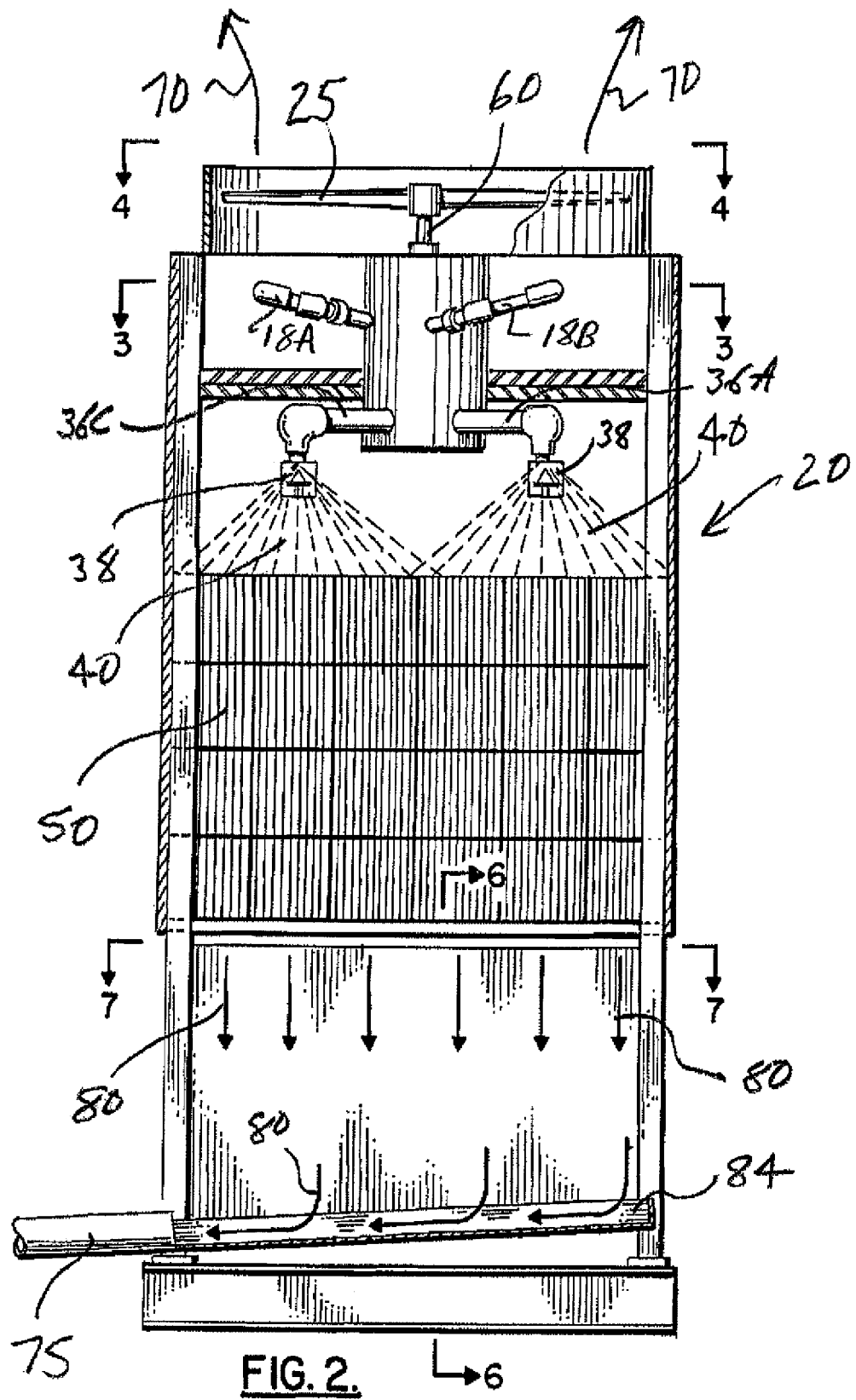
FIG. 2 illustrates a cross-section view of the auxiliary cooling tower of the present invention.

Continuing with the process, as the water continues to flow into the auxiliary tower 20, the water flow would flow off of blades 32 and would flow into a plurality of flow pipes 36A through 36D. At this point, the water flow would be directed into a series of nozzles 38, as seen in FIG. 5, wherein the water, as depicted by lines 40 in FIG. 2, would flow through a very sophisticated film fill layer 50, preferably 48 inches in depth. During this process, the rotation of the turbine blade 30, which is on the same shaft 60 as the upper cooling blade 25, as was discussed earlier, would import rotation to blade 25. Blade 25 would draw air up through the film fill, in the direction of arrows 70, as seen in FIG. 2, as the warm water is flowing down through the fill 50.

Figure 6:
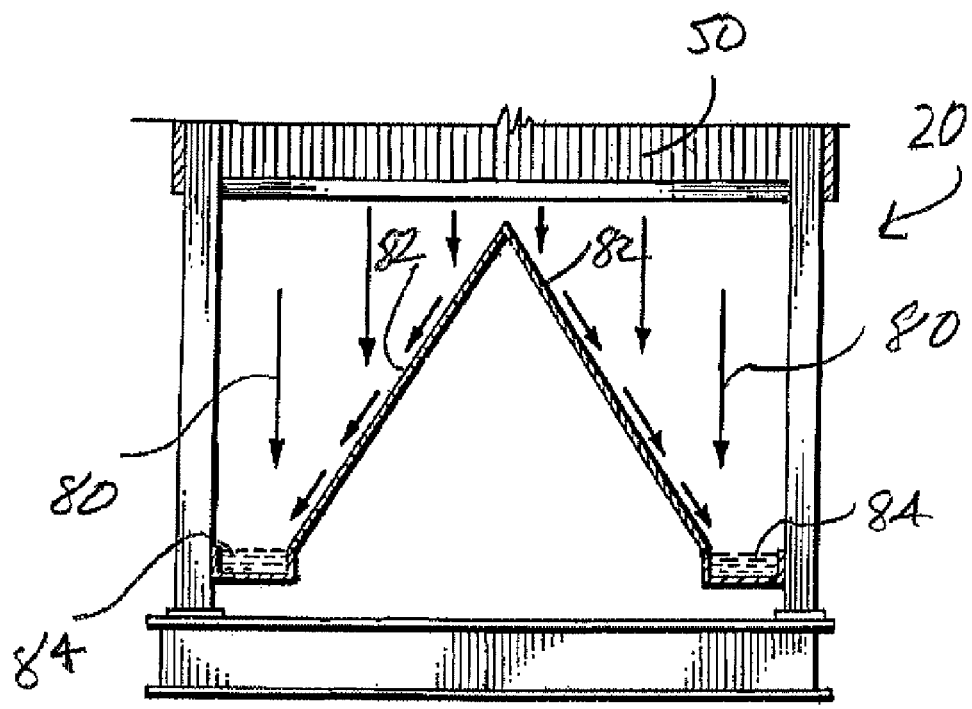
FIG. 6 illustrates a cross-section view of the system of the present invention along lines six-6 in FIG. 2.
Figure 7:
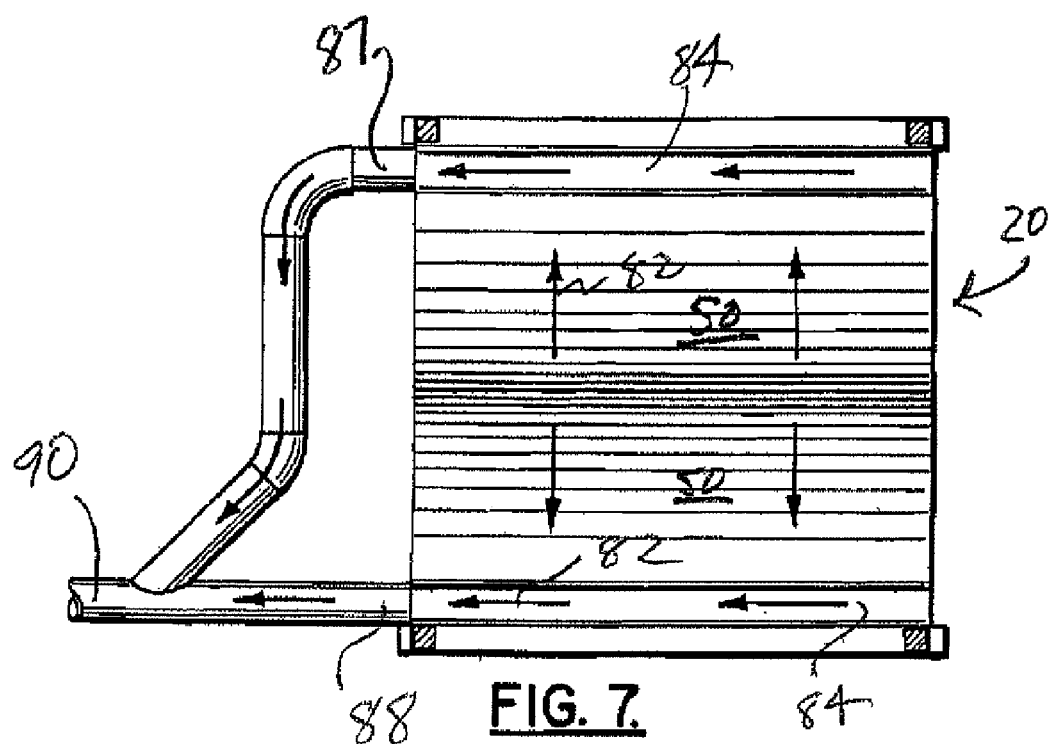
FIG. 7 illustrates a cross-section view of the system of the present invention along lines 7-7 in FIG. 2.

Turning now to FIGS. 6 and 7, in FIG. 6, the water flow, shown by arrows 80, flow from the fill 50, cooled by the air flow through the fill 50, and is diverted by angulated floor portion 82, downward into two flow areas 84 at both sides of auxiliary tower 20. The water from the two flow areas 84, 85, flow into flow lines 87, 88, which are then joined into a single flow line 90 to be returned to the lower portion 21 of main tower 12, as seen in FIG. 1, and the cooled water could then be reused in the system.

Figure 8:
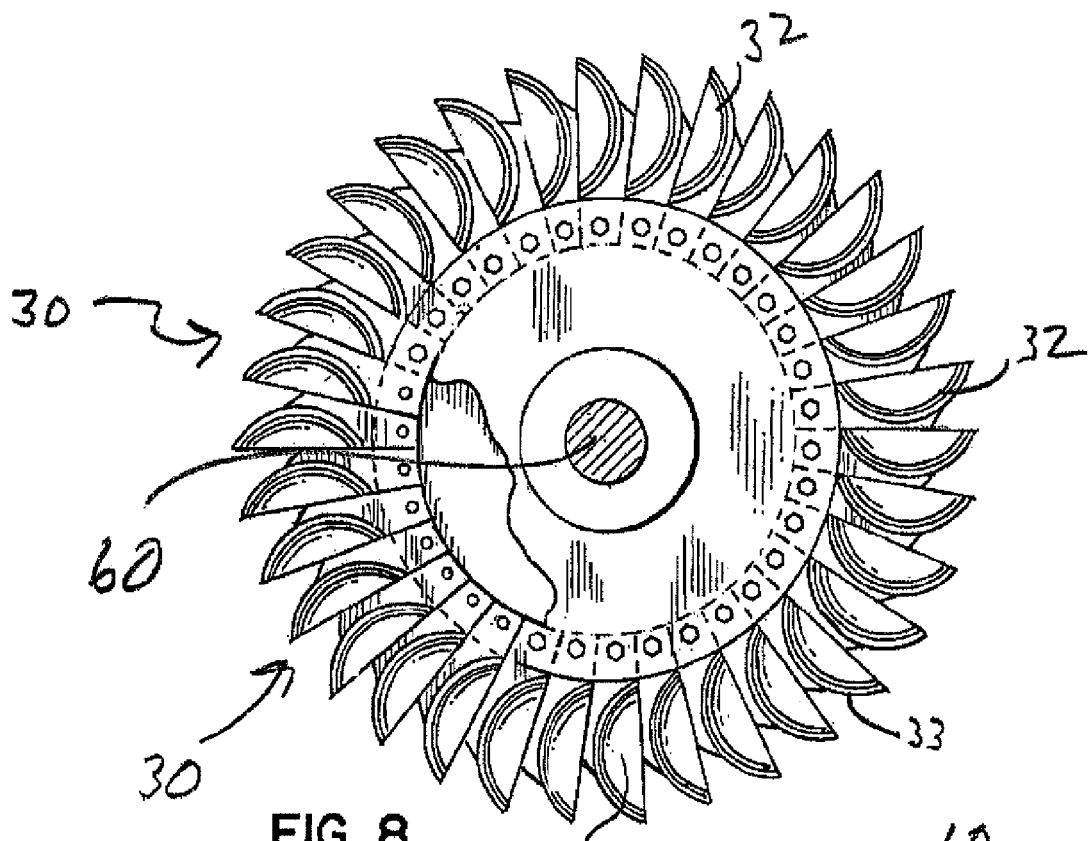
FIG. 8 illustrates a top view of the turbine component of the system of the present invention.
Figure 9:
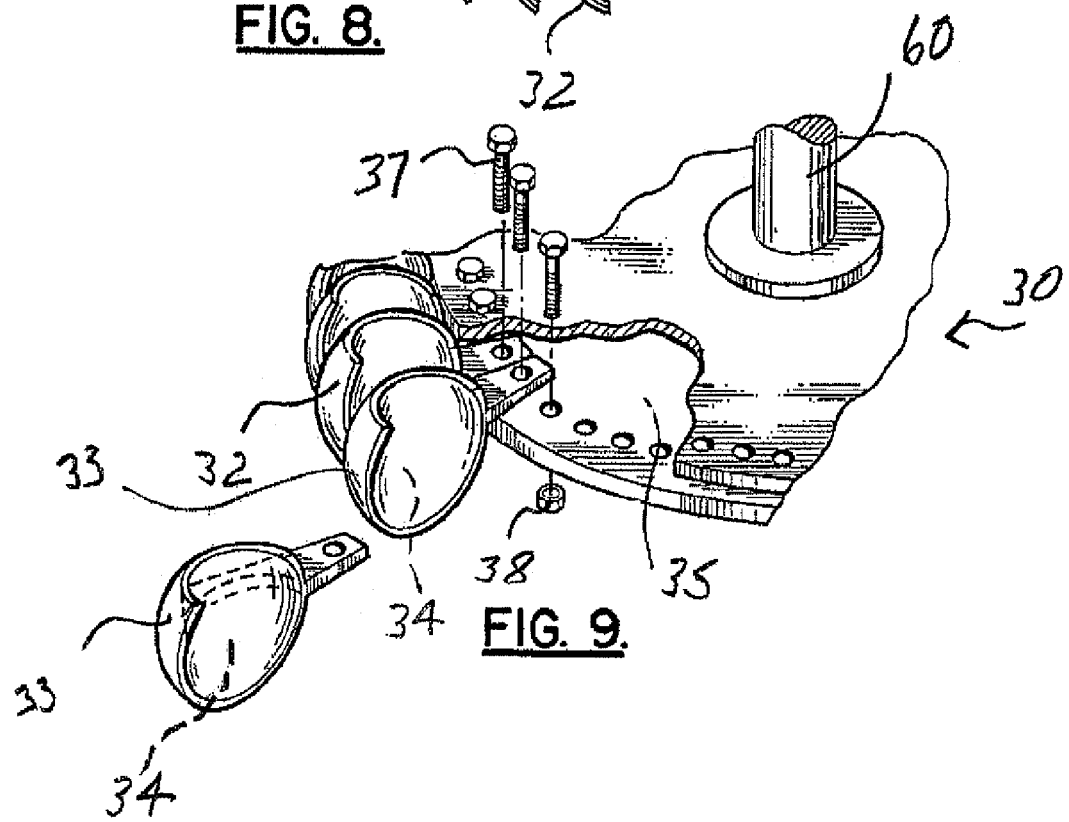
FIG. 9 illustrates an isolated view of the turbine blades in the system of the present invention.

As seen in detail view in FIGS. 8 and 9, each of the individual blades 32 are attached to a central rotating hub 35 through a series of screws 37 and nuts 38 so that the individual turbine blades 32 can be replaced, if necessary. It is also seen that because of the numerous number of blades 32, and the cup 33 shape of each blade, as discussed earlier, and as seen in FIG. 8, the turbine 30 is driven at sufficient speed to impart sufficient rotation to fan blade 25 to allow the fan to draw up sufficient air through the fill 50 in auxiliary tower 20 to cool the water. In this way, the main tower 12 is able to take a portion of the heated water and direct it to the auxiliary power, which is a savings in power, and therefore thou would result in a much more efficient system.

As seen in detail in FIG. 5, it is clear that the turbine 30 mounted on shaft 60, is a single shaft upon which the cooling blade 25 is mounted, so that both the turbine 30 and cooling blade 25 are driven by the water flow under pressure. This ability to drive blade 25 through the use of water from the main tower under pressure is the reason that the system is so efficient, and the reason that the water is to be cooled in the main tower at a rate which uses less power than a conventional cooling tower system.

FIG. 10, which could be looked at in conjunction with FIGS. 8 and 9 illustrates, in partial view, the plurality of individual blades 32 of turbine 30 being driven by the water flow 39 under pressure from an individual nozzle 22. It should be noted in FIG. 10 that the angle 41 of the nozzle 22 is precise so that the water is contacting the individual blades 32 at a point to obtain the most efficiency in driving the rotation of the turbine during the process.

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. An energy efficient cooling tower system, comprising:
   a. a principal cooling tower;
   b. an auxiliary cooling tower for receiving a portion of warm water flowing into the main tower;
   c. a central shaft mounted vertically in the auxiliary tower;
   d. a turbine mounted on a portion of the shaft;
   e. a cooling blade mounted on the upper end of the shaft;
   f. a water jetting system delivering the warm water under pressure from the main cooling tower into the auxiliary cooling tower to impart rotation to the turbine blades for imparting rotation to the cooling blade;
   g. a quantity of high efficiency film fill in that portion of the tower below the turbine for receiving the water coming off of the turbine blades; and
   h. air flow produced by rotation of the cooling blade upward through the fill in order to cool the water before it is returned to the main cooling tower.

2. The system in claim 1, wherein the high efficiency fill is approximately four feet in thickness.

3. The system in claim 1, wherein the rotation of the turbine and the upper cooling blade is powered only by the pressurized flow of water to drive the rotation of the turbine.

4. The system in claim 1, wherein the positioning of the turbine on the same shaft as the cooling blade and powering it with water from the main cooling tower eliminates the need for a motor to drive the turbine.

5. The system in claim 1, wherein the cooled water returned to the main cooling tower can be re-circulated through the system.

6. A method of using an auxiliary cooling tower with a main cooling tower in order to conserve energy, comprising the following steps:
   a. providing an auxiliary tower;
   b. mounting a central shaft vertically in the auxiliary tower;
   c. mounting a turbine on a portion of the shaft;
   d. mounting a cooling blade on the upper end of the shaft powered by the turbine;
   e. providing a main cooling tower to cool heated water flowing into the main cooling tower;
   f. diverting a portion of the warm water flowing to the main cooling tower into the auxiliary cooling tower under pressure;
   g. using the water under pressure to impart rotation to the turbine and rotation to the cooling blade;
   h. providing a quantity of high efficiency film fill in that portion of the auxiliary cooling tower below the turbine for receiving the warm water coming off of the turbine blades;
   i. imparting air flow produced by rotation of the cooling blade upward through the fill to cool the warm water before it is returned to the system; and
   j. repeating steps f through i in a continuous cycle during operation of the main and auxiliary cooling towers.

7. An efficient cooling tower system, comprising:
   a. an auxiliary cooling tower receiving a portion of heated water directed to a main cooling tower;
   b. a central shaft mounted vertically in the auxiliary tower;
   c. a turbine mounted on a portion of the shaft;
   d. a cooling blade mounted on the upper end of the shaft;
   e. a water jetting system delivering water under pressure into the auxiliary cooling tower to impart simultaneous rotation to the turbine and the cooling blade;
   f. a quantity of high efficiency film fill in that portion of the tower below the turbine for receiving the water coming off of the turbine; and
   g. air flow produced by rotation of the cooling blade upward through the fill in order to cool the water moving downward through the fill to be returned to the system.

8. The system in claim 7, wherein positioning of the turbine on the same shaft as the cooling blade and powering it with water eliminates the need for a motor to drive the turbine to provide a more efficient power delivery system.

9. The system in claim 7, wherein the diversion of warm water into the auxiliary system to be cooled by rotation of the turbine and cooling blade results in a savings in energy in the entire system.

10. The system in claim 7, wherein the main cooling tower receives the cooled water from the auxiliary cooling tower for collecting heat from the air and returning some of the warm water to the auxiliary cooling tower to continue to drive the turbine.

11. The system in claim 7, wherein the cooling system is particularly suitable to be adapted to large industrial towers.

* * * * *